(12) United States Patent
Kang et al.

(10) Patent No.: US 9,729,486 B2
(45) Date of Patent: Aug. 8, 2017

(54) VEHICLE NETWORK TRANSMISSION METHOD AND TRANSMISSION SYSTEM

(71) Applicant: INDUSTRIAL TECHNOLOGY RESEARCH INSTITUTE, Hsinchu (TW)

(72) Inventors: Po-Chun Kang, Chiayi County (TW); Tzu-Hsiang Su, Taichung (TW); Kuo-Huang Hsu, Taoyuan County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 185 days.

(21) Appl. No.: 14/219,647

(22) Filed: Mar. 19, 2014

(65) Prior Publication Data

US 2014/0286325 A1 Sep. 25, 2014

Related U.S. Application Data

(60) Provisional application No. 61/803,462, filed on Mar. 20, 2013.

(30) Foreign Application Priority Data

Dec. 26, 2013 (TW) .............................. 102148460 A (51) Int. Cl.
*H04L 12/58* (2006.01)
*H04L 12/18* (2006.01)
(Continued)

(52) U.S. Cl.
CPC .......... *H04L 51/20* (2013.01); *H04L 12/1845* (2013.01); *H04W 4/20* (2013.01);
(Continued)

(58) Field of Classification Search
None
See application file for complete search history.

(56) References Cited

U.S. PATENT DOCUMENTS 6,985,089 B2 1/2006 Liu et al.
7,672,270 B2 3/2010 Roggero et al.
(Continued)

FOREIGN PATENT DOCUMENTS

CN 102665168 A 9/2012
TW I336669 B 2/2011
WO WO 2006-008722 A1 1/2006

OTHER PUBLICATIONS

Ozan K. Tonguz et al., "On the Broadcast Storm Problem in Ad hoc Wireless Networks" Broadnets 2006, 3rd International Conference on Broadband Communications, Networks and Systems, Oct. 2006.
(Continued)

*Primary Examiner* — Yaotang Wang
(74) *Attorney, Agent, or Firm* — Rabin & Berdo, P.C.

(57) ABSTRACT

A vehicle network transmission method and a vehicle network transmission system are provided. The vehicle network transmission method comprises the following steps. A first transmission device transmits a data signal to a second transmission device. It is determined whether the second transmission device is located in a target area. If the second transmission device is located in the target area, then a geographic location of the first transmission device is retrieved and a transmission region of the first transmission device is calculated. It is determined whether all of the third transmission devices adjacent to the second transmission device in the target area are located in the transmission region. If all of the third transmission devices adjacent to the second transmission device in the target area are located in
(Continued)

the transmission region, then the second transmission device does not continue forwarding the data signal.

21 Claims, 4 Drawing Sheets

(51) Int. Cl.
| | | |
|---|---|---|
| *H04W 4/20* | (2009.01) | |
| *H04W 76/00* | (2009.01) | |
| *G08G 1/09* | (2006.01) | |
| *H04L 29/08* | (2006.01) | |
| *H04W 4/02* | (2009.01) | |
| *H04W 4/04* | (2009.01) | |
| *H04W 4/06* | (2009.01) | |
| *H04W 40/20* | (2009.01) | |
| *H04W 84/18* | (2009.01) | |

(52) U.S. Cl.
CPC .......... *H04W 76/002* (2013.01); *G08G 1/091* (2013.01); *H04L 67/12* (2013.01); *H04W 4/021* (2013.01); *H04W 4/023* (2013.01); *H04W 4/046* (2013.01); *H04W 4/06* (2013.01); *H04W 40/20* (2013.01); *H04W 84/18* (2013.01)

(56) References Cited

U.S. PATENT DOCUMENTS

| | | | |
|---|---|---|---|
| 8,050,188 | B2 | 11/2011 | Bai et al. |
| 8,059,012 | B2 | 11/2011 | Bai et al. |
| 2006/0221891 | A1* | 10/2006 | Schmitz et al. ............. 370/328 |
| 2009/0046628 | A1* | 2/2009 | Hall ...................... H04W 40/20 370/328 |
| 2011/0012756 | A1* | 1/2011 | Yamamoto ................... 340/905 |
| 2013/0099941 | A1* | 4/2013 | Jana ...................... H04W 4/023 340/905 |
| 2013/0301406 | A1* | 11/2013 | Sakata ........................ 370/229 |

OTHER PUBLICATIONS

Zhong-Yi Liu et al., "An Opportunistic Approach to Enhance the Geographical Source Routing Protocol for Vehicular Ad Hoc Networks" 2009 IEEE 70th Vehicular Technology Conference Fall (VTC 2009-Fall), pp. 1-5, Sep. 2009.

George-Cristian Serban et al., "Routing protocol for urban mobile networks based on geographical location" 2010 IEEE International Conference on Intelligent Computer Communication and Processing (ICCP), pp. 479-482, Aug. 2010.

Vivek Pathak et al., "Securing location aware services over VANET using geographical secure path routing" ICVES 2008, IEEE International Conference on Vehicular Electronics and Safety, pp. 346-353, Sep. 2008.

Xiaoli Ma et al., "An Efficient Path Pruning Algorithm for Geographical Routing in Wireless Networks" IEEE Transactions on Vehicular Technology, vol. 57, Issue 4, pp. 2474-2488, Jul. 2008.

Guangtao Xue et al., "A Passive Geographical Routing Protocol in VANET" APSCC 08, IEEE Asia-Pacific Services Computing Conference, pp. 680-685, Dec. 2008.

Youngbae Kong et al. "Location Error Compensation for Geographic Routing in WSNs", IEICE Transactions on Communications, Communications Society, Tokyo, Japan, Nov. 1, 2010, p. 2971-2975, vol. E93B, No. 11, XP-001559471.

* cited by examiner

VEHICLE NETWORK TRANSMISSION METHOD AND TRANSMISSION SYSTEM

This application claims the benefit of U.S. provisional application Ser. No. 61/803,462, filed Mar. 20, 2013, and claims the benefit of Taiwan application Serial No. 102148460, filed Dec. 26, 2013, the disclosure of which are incorporated by reference herein in its entirety.

TECHNICAL FIELD

The disclosure relates to a vehicle network transmission method and a vehicle network transmission system.

BACKGROUND

At present, in the telematics field, the developing speed of the vehicular ad-hoc network is fairly quick. How to correctly transmit the message to the required vehicle and effectively transmit the message in the network are the problems to be solved at present. So, European Telecommunications Standards Institute (ETSI) proposes a GeoNetworking (GN) transmission protocol, which is a transmission protocol in a network layer and enhances the transmission efficiency of the message in the vehicular ad-hoc network (VANET) to avoid the problem of broadcast storm caused when the message is transmitted in the network. Although the GN protocol enables the VANET to effectively transmit the network message to the target area based on the geographic location information, the redundant packet forwarding problem occurs inside and outside the target area. Furthermore, most source ends of inter-vehicle messages repeatedly broadcast the information thereof, and do not need to make the most people in the range be able to receive one single packet in practice. So, transmitting the message in this manner tends to induce the excess repeated packets.

Therefore, how to effectively transmit the network message to the target area has become an industrial direction of continuous efforts.

SUMMARY

The disclosure is directed to a vehicle network transmission method and a vehicle network transmission system.

According to one embodiment of the disclosure, a vehicle network transmission method is provided. The vehicle network transmission method comprises the following steps. A first transmission device transmits a data signal to a second transmission device. It is determined whether the second transmission device is located in a target area. If the second transmission device is located in the target area, a geographic location of the first transmission device is retrieved. A transmission region of the first transmission device is calculated. It is determined whether all of at least one third transmission device(s) adjacent to the second transmission device in the target area are located in transmission region. If all of the third transmission devices adjacent to the second transmission device in the target area are located in the transmission region, then the second transmission device does not continue forwarding the data signal.

According to another embodiment of the disclosure, a vehicle network transmission system is provided. The vehicle network transmission system comprises a first transmission device, a second transmission device and at least one third transmission device. The first transmission device is disposed on a first vehicle and transmits a data signal. The second transmission device is disposed on a second vehicle and receives the data signal. The at least one third transmission device disposed on a third vehicle and adjacent to the second transmission device. The second transmission device does not continue forwarding the data signal when the second transmission device is located in a target area and all of the third transmission devices adjacent to the second transmission device in the target area are located in a transmission region of the first transmission device.

According to an alternative embodiment of the disclosure, a transmission device disposed on a vehicle is provided. The transmission device includes a transmission unit and a processing unit. The transmission unit receives a data signal transmitted by a previous transmission device. The processing unit coupled to the transmission unit. The processing unit controls the transmission unit not to continue forwarding the data signal when the transmission device is located in a target area and all of next transmission devices adjacent to the transmission device in the target area are located in a transmission region of the previous transmission device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
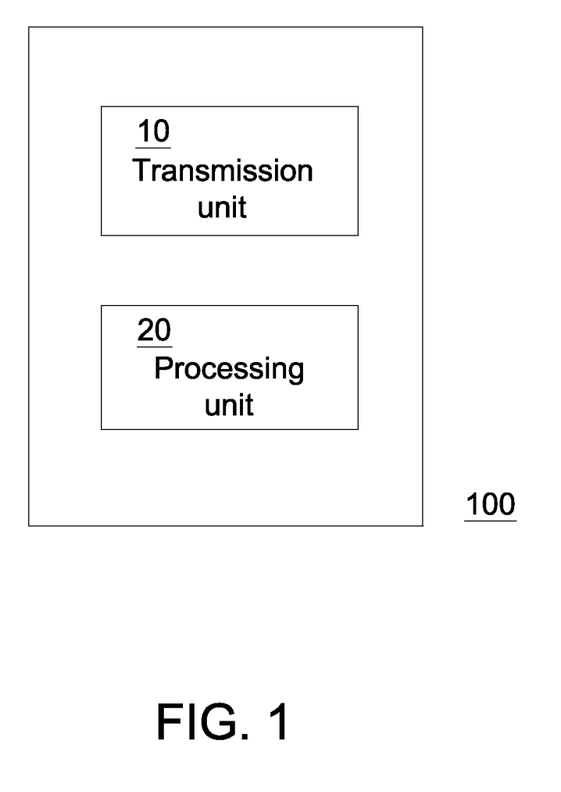
FIG. 1 shows a second transmission device according to one embodiment.
Figure 2:
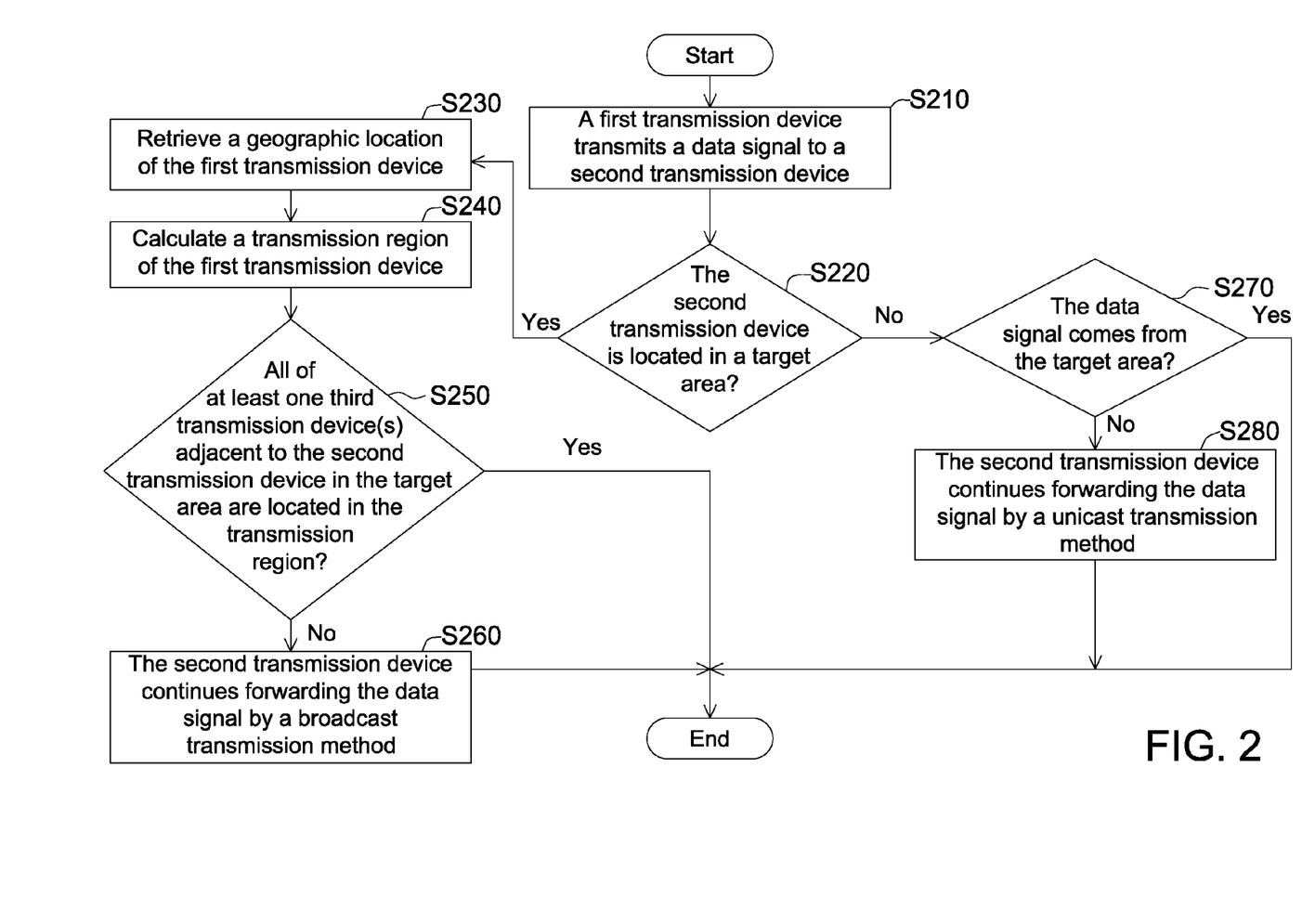
FIG. 2 shows a flow chart of a vehicle network transmission method according to one embodiment.
Figure 3:
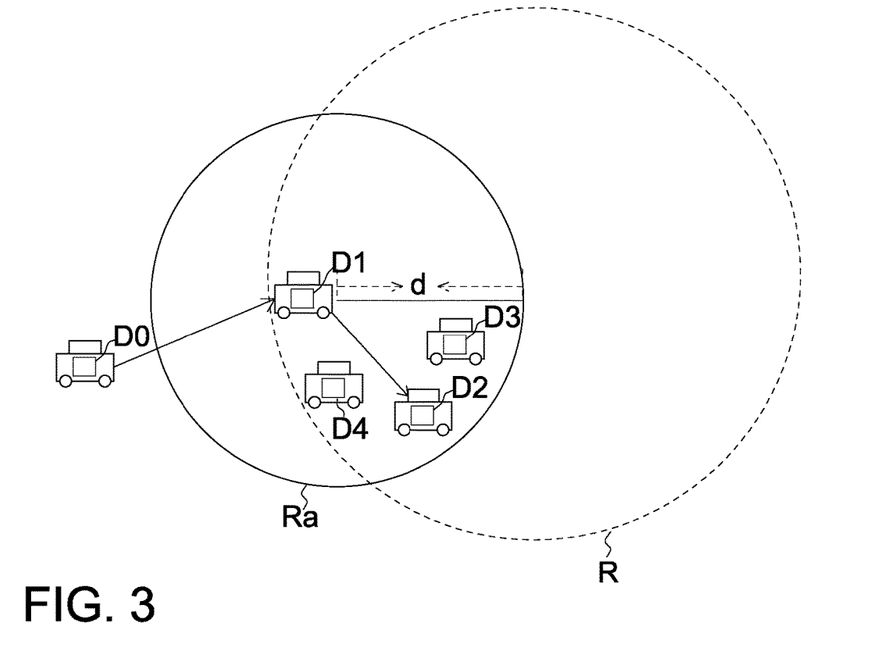
FIG. 3 shows a first example according to the vehicle network transmission method of FIG. 2.

FIG. 1 shows a second transmission device according to one embodiment. FIG. 2 shows a flow chart of a vehicle network transmission method according to one embodiment. FIG. 3 shows a first example according to the vehicle network transmission method of FIG. 2. Referring to FIGS. 1 to 3, the vehicle network transmission system comprises transmission devices (e.g., the transmission devices D0, D1, D2, D3 and D4 in FIG. 3). The transmission devices D0, D1, D2, D3 and D4 are disposed on different vehicles, respectively. In step S210 of FIG. 2, a first transmission device transmits a data signal to a second transmission device. As shown in FIG. 1, the second transmission device comprises a transmission unit 10 and a processing unit 20. The processing unit 20 coupled to the transmission unit 10. In the practical application, the transmission unit 10 may be, but without limitation to, a wireless fidelity (WiFi) network interface or a bluetooth network interface. In addition, the processing unit 20 may be, but without limitation to, a micro-processing chip, a firmware circuit or a storage medium storing a plurality of sets of program codes.

Next, as shown in the example of FIG. 3, the first transmission device is the transmission device D1 of FIG. 3, the second transmission device is the transmission device D2 of FIG. 3. The data signal, after being outputted from the transmission device D0, is gradually transmitted to the transmission device D1, and then the transmission device D1 transmits the data signal to the transmission device D2. In this step, after the transmission unit 10 of the second transmission device receives the data signal, processing unit 20 can further determine whether the data signal has been repeatedly received. If the data signal has been repeatedly received, the procedure ends. However, the system may be selectively designed to decide whether to perform this determination according to the design requirement.

In step S220, the second transmission device, which has received the data signal, utilizes the processing unit 20 to determine whether the second transmission device is located in a target area. In this embodiment, the second transmission device can determine whether it is located in the target area by using a satellite positioning system. If yes, step S230 is entered; and if not, step S270 is entered. In the example of FIG. 3, the transmission device D2 determines whether the transmission device D2 is located in a target area R.

In the step S230, the second transmission device utilizes the processing unit 20 to retrieve a geographic location of the first transmission device. Each of the transmission devices in the vehicle network periodically transmits the data signal. The data signal comprises the geographic location of the transmission device. And the geographic location of the transmission device can make the directly adjacent transmission device according to the received data signal to maintain a table, such as a neighbor table of the transmission device itself. Thus, the second transmission device can obtain the geographic location of the first transmission device according to the data signal, and the second transmission device can store the geographic location of the first transmission device in the neighbor table of the second transmission device. Wherein, the geographic location of the first transmission device is periodically transmitted by the first transmission device. Accordingly, the second transmission device obtains the geographic location of the first transmission device by looking up the neighbor table. In the example of FIG. 3, the transmission device D2 can retrieve a geographic location of the transmission device D1 by this method.

In addition, in step S240, the processing unit 20 of the second transmission device calculates a transmission region of the first transmission device. In the example of FIG. 3, the transmission device D2 calculates a transmission region Ra of the transmission device D1.

In step S250, the processing unit 20 of the second transmission device determines whether all of at least one third transmission device(s) adjacent to the second transmission device in the target area are located in the transmission region. If not, step S260 is entered; and if yes, the procedure ends. In the example of FIG. 3, the transmission device D2 determines whether the transmission devices D3, D4 adjacent to the transmission device D2 in the target area R are located in the transmission region Ra.

In addition, in the step S250, each of at least one third transmission device(s) adjacent to the second transmission device in the target area periodically transmits the data signal to the second transmission device. The data signal comprises the geographic location of the at least one third transmission device corresponding thereto. Next, the processing unit 20 of the second transmission device stores the geographic location of each of the at least one third transmission device in a table, so that the processing unit 20 of the second transmission device can obtain the geographic location of each of the at least one third transmission device by looking up the table.

In one embodiment, the steps S240 to S250 can evaluate the signal transmission distance of the first transmission device according to the attenuation model of the received signal strength intensity (RSSI). The following Equation (1) represents the RSSI attenuation model:

$$[p(d)]_{dBm} = [p(d_0)]_{dBm} - 10 n lg\left(\frac{d}{d_0}\right), \quad (1)$$

wherein p(d) represents the received RSSI when the distance from the signal transmitting end to the signal receiving end is equal to d meters, p(d0) represents the received RSSI when the distance from the signal transmitting end to the signal receiving end is equal to d0 meters, and n represents the path loss exponent. The transmission region is calculated by performing the following steps according to the equation.

Each neighbor vehicle transmits a beacon carried with the geographic location, and the path loss exponent n of the transmitting end is calculated according to the continuous RSSI transmitted by the same neighbor vehicle.

In the example of FIG. 3, the transmission device D1 outputs the data signal at the $5^{th}$ second, the distance from the transmission device D1 to the transmission device D2 is equal to 100 meters, and the transmission device D2 receives the beacon outputted from the transmission device D1. At this time, the transmission device D2 detects the RSSI of the beacon as −45. Next, the transmission device D1 again outputs the data signal at the $5.1^{st}$ second, the distance from the transmission device D1 to the transmission device D2 is equal to 95 meters, and the transmission device D2 receives the beacon outputted from the transmission device D1. At this time, the transmission device D2 detects the RSSI of the beacon as −40. Next, the transmission device D2 substitutes the known data into Equation (1) to obtain: −45=−40−[10*n*log(100/95)] and thus calculates the path loss exponent n of the transmission device D1.

When the transmission device D2 receives the beacon, the transmission device D2 checks the path loss exponents n of all of the neighbor vehicles, and takes the most suitable path loss exponent n to calculate the remaining signal transmission distance. The step of taking the path loss exponent n may be performed by the statistical method, such as the minimum, the mode, the average, the maximum or the regression statistical method.

In the above-mentioned example, it is assumed that −95 is the signal baseline that can be resolved by the apparatus, and that 2.3 is the optimum path loss exponent n of the existing statistics. In this case, when the distance from the transmission device D1 to the transmission device D2 is equal to 100 meters, the transmission device D2 receives the beacon outputted from the transmission device D1, and the transmission device D2 detects the RSSI of the beacon as −45, the known data may be substituted into Equation (1) to obtain the formula of −95=−45−[10*2.3*log(d/100)] and thus to calculate the distance d and the transmission region Ra of the transmission device D1.

It is determined whether the distance between the transmission device D2 and the neighbor vehicle falls within the transmission region Ra according to the calculated transmission region Ra of the transmission device D1.

For example, in FIG. 3, the transmission device D2 determines that the transmission devices D3, D4 adjacent to the transmission device D2 in the target area R are both located in the transmission region Ra according to the method mentioned hereinabove. Because the transmission devices D3, D4 are both located in the transmission region Ra, the transmission device D2 does not continue forwarding the data signal. Thus, the condition of repeatedly broadcasting the data signal in the transmission region Ra of the transmission device D1 can be decreased.

In addition, in the step S250, the processing unit 20 of the second transmission device determines whether all of at least one third transmission device(s) adjacent to the second transmission device in the target area are located in the transmission region. If not, the step S260 is performed.

Figure 4:
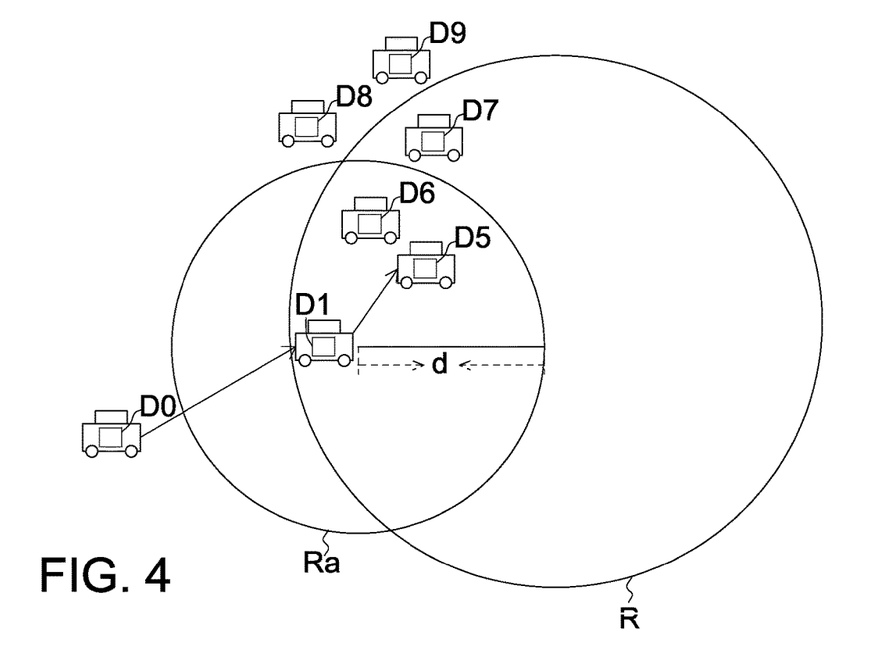
FIG. 4 shows a second example according to the vehicle network transmission method of FIG. 2.

In the step S260, the processing unit 20 of the second transmission device controls the transmission unit 10 to continue forwarding the data signal according to a broadcast transmission mode. FIG. 4 shows a second example according to the vehicle network transmission method of FIG. 2. In the example of FIG. 4, after the transmission device D5 receives the data signal coming from the transmission device D1, the transmission device D5 determines that not all of the adjacent transmission devices D6 to D9 are located in the transmission region Ra of the transmission device D1. For example, the transmission devices D7 to D9 are not located in the transmission region Ra of the transmission device D1. In this case, the transmission device D5 continues forwarding the data signal to its neighboring transmission devices D6 to D9 according to the broadcast transmission mode.

On the other hand, in the step S220 of FIG. 2, when the processing unit 20 of the second transmission device determines that it is not located in the target area, the step S270 is performed.

In the step S270, the processing unit 20 of the second transmission device determines whether the data signal comes from the target area. If yes, the processing unit 20 of the second transmission device controls the transmission unit 10 not to continue forwarding the data signal; and if not, step S280 is entered. In addition, in the step S270, the second transmission device can perform the geographic comparison to determine whether the first transmission device is located in the target area according to the location information of the first transmission device and the range of the target area. If the first transmission device is located in the target area, then it is obtained that the data signal comes from the target area. In addition, it is also possible to determine whether the data signal comes from the target area by a transmission method of the data signal. If the transmission method is the broadcast transmission mode, then the data signal is determined as coming from the target area. If the transmission method is the unicast transmission mode, then the data signal does not come from the target area.

Figure 5:
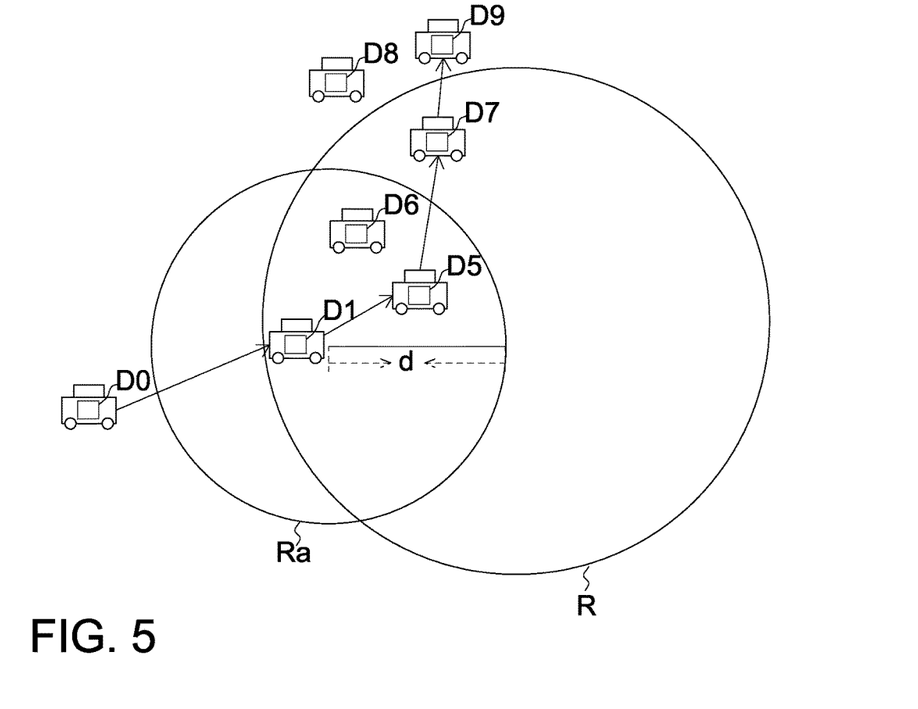
FIG. 5 shows a third example according to the vehicle network transmission method of FIG. 2.

FIG. 5 shows a third example according to the vehicle network transmission method of FIG. 2. In the example of FIG. 5, when the transmission device D9 located outside the target area R receives the data signal outputted from the transmission device D7 coming from the target area R, the transmission device D9 determines that the data signal comes from the target area R and does not continue forwarding the data signal. Accordingly, it is possible to prevent the transmission device, located outside the target area R, forwarding the data signal from outside the target area R, and then the data signal transmitted back to the target area R to cause the unessential signal transmission.

In addition, in the step S270, if the processing unit 20 of the second transmission device determines that the data signal does not come from the target area, then the step S280 is performed. The processing unit 20 of the second transmission device controls the transmission unit 10 to continue forwarding the data signal by the unicast transmission mode.

Figure 6:
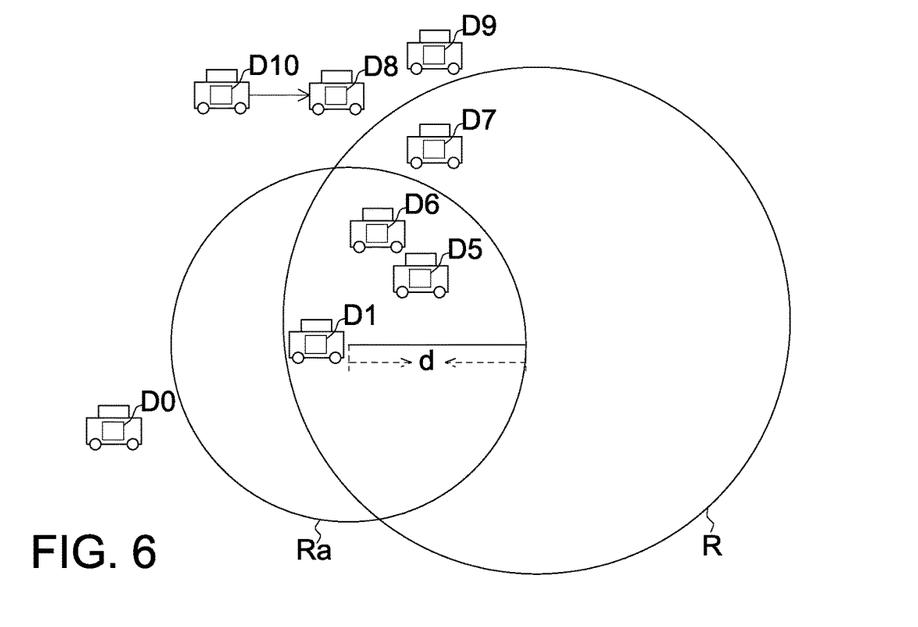
FIG. 6 shows a fourth example according to the vehicle network transmission method of FIG. 2.

FIG. 6 shows a fourth example according to the vehicle network transmission method of FIG. 2. In the example of FIG. 6, the transmission device D10 transmits the data signal to the transmission device D8. At this time, the transmission device D8 determines that the data signal does not come from the target area R, and the transmission device D8 continues forwarding the data signal by the unicast transmission mode. In addition, the transmission device D8 in this embodiment can look up the table stored in a storage unit (e.g., a hard drive or a memory card) to obtain another vehicle, which is located in the transmission region of the transmission device D8 and nearest the target area R. Next, the transmission device D8 again transmits the data signal to the another vehicle, which is located in the transmission region of the transmission device D8 and nearest the target area R by the unicast transmission mode. According to this method, the data signal can be transmitted toward the target area R.

The disclosure proposes a locality packet forward mechanism applicable to the vehicle network, wherein the transmission devices outside the target area perform the transmission by the unicast transmission mode, while the transmission devices located in the target area perform the transmission by the broadcast transmission mode. In addition, the vehicle in the target area determines whether the packets are transmitted again according to the signal strength intensity of the data signal and the location information of the neighbor vehicle, and the vehicle outside the target area determines whether the packets have to be transmitted again according to the signal source or the transmission method.

Compared with the existing standard mechanism, this disclosure can decrease the redundant packets to be transmitted again, and thus enhance the network quality. In addition, the disclosure is also compatibility with the existing standard, so the above-mentioned method may also be applied to the GeoNetworking and the congestion control standards. Thus, the disclosure can make the VANET effectively transmit the network message to the target area based on the geographic location information.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A vehicle network transmission method, comprising the steps of:
   a first transmission device transmitting a data signal to a second transmission device;
   determining whether the second transmission device is located in a target area;
   retrieving a geographic location of the first transmission device if the second transmission device is located in the target area;
   calculating a signal transmission distance of the first transmission device based on an attenuation model of a received signal strength intensity (RSSI) of the second transmission device; and
   determining whether at least one third transmission device adjacent to the second transmission device in the target area is located in the signal transmission distance;

wherein the second transmission device does not continue forwarding the data signal to the at least one third transmission device upon determining that the at least one third transmission device adjacent to the second transmission device in the target area is located in the signal transmission distance of the first transmission device, and the second transmission device determines whether to forward the data signal to the at least one third transmission device based on a distance between the at least one third transmission device and the first transmission device.

2. The transmission method according to claim 1, further comprising the steps of:
determining whether the data signal comes from the target area if the second transmission device is not located in the target area; and
the second transmission device does not continue forwarding the data signal if the data signal comes from the target area.

3. The transmission method according to claim 2, wherein the step of determining whether the data signal comes from the target area further comprises:
performing geographic comparison according to a location of the first transmission device and a range of the target area, and determining whether the first transmission device is located in the target area, wherein the data signal comes from the target area if the first transmission device is located in the target area.

4. The transmission method according to claim 2, wherein the step of determining whether the data signal comes from the target area comprises:
determining whether a transmission mode of the data signal is a broadcast transmission mode or a unicast transmission mode;
the data signal comes from the target area if the transmission method of the data signal is the broadcast transmission mode; and
the data signal does not come from the target area if the transmission method of the data signal is the unicast transmission mode.

5. The transmission method according to claim 1, wherein in the step of retrieving the geographic location of the first transmission device, the geographic location of the first transmission device together with the data signal are transmitted to the second transmission device.

6. The transmission method according to claim 5, wherein in the step of retrieving the geographic location of the first transmission device, the data signal is periodically transmitted to the second transmission device, the geographic location of the first transmission device is stored in a table, and the second transmission device obtains the geographic location of the first transmission device by looking up the table.

7. The transmission method according to claim 1, wherein in the step of determining whether the at least one third transmission device adjacent to the second transmission device in the target area is located in the signal transmission distance the at least one third transmission device periodically transmits another data signal to the second transmission device, and stores a geographic location of the at least one third transmission device in a table, and the second transmission device obtains the geographic location of the at least one third transmission device by looking up the table.

8. A vehicle network transmission system, comprising:
a first transmission device, which is disposed on a first vehicle and transmits a data signal;
a second transmission device, which is disposed on a second vehicle and receives the data signal; and
at least one third transmission device disposed on a third vehicle and adjacent to the second transmission device, wherein
the second transmission device does not continue forwarding the data signal to the at least one third transmission device if the second transmission device determines that the second transmission device is located in a target area and determines that the at least one third transmission device adjacent to the second transmission device in the target area is located in a signal transmission distance of the first transmission device,
the second transmission device determines whether to forward the data signal to the at least one third transmission device based on a distance between the at least one third transmission device and the first transmission device, and
the signal transmission distance of the first transmission device is obtained based on an attenuation model of a received signal strength intensity (RSSI) of the second transmission device.

9. The transmission system according to claim 8, wherein the second transmission device does not continue forwarding the data signal to the at least one third transmission device if the second transmission device determines that when the second transmission device is not located in the target area and determines that the data signal comes from the target area.

10. The transmission system according to claim 9, wherein the second transmission device determines that the data signal comes from the target area if the second transmission device determines upon determining that a location of the first transmission device is in a range of the target area.

11. The transmission system according to claim 9, wherein:
the second transmission device further determines that the data signal comes from the target area when a transmission mode of the data signal is a broadcast transmission mode; and
the second transmission device further determines that the data signal does not come from the target area when the transmission mode of the data signal is a unicast transmission mode.

12. The transmission system according to claim 8, wherein the second transmission device retrieves a geographic location of the first transmission device if the second transmission device determines upon determining that the second transmission device is located in the target area, and the geographic location of the first transmission device together with the data signal are transmitted to the second transmission device.

13. The transmission system according to claim 12, wherein the data signal is periodically transmitted to the second transmission device, the second transmission device further stores a geographic location of the first transmission device in a table, and the second transmission device obtains the geographic location of the first transmission device by looking up the table.

14. The transmission system according to claim 8, wherein each of the at least one third transmission device periodically transmits another data signal to the second transmission device, the second transmission device further stores a geographic location of the at least one third transmission device in a table, the second transmission device by looking up the table to obtain the geographic location of the at least one third transmission device.

15. A transmission device disposed on a vehicle, the transmission device comprising:
- a transmission unit receiving a data signal transmitted by a previous transmission device; and
- a processing unit, which is electrically coupled to the transmission unit, and controls the transmission unit not to continue forwarding the data signal when the transmission device is located in a target area and at least one next transmission device adjacent to the transmission device in the target area is located in a signal transmission distance of the previous transmission device, and the processing unit determines whether to forward the data signal to the at least one next transmission device based on a distance between the at least one next transmission device and the previous transmission device, wherein
- the processing unit calculates the signal transmission distance of the previous transmission device based on an attenuation model of a received signal strength intensity (RSSI) of the transmission device itself.

16. The transmission device according to claim 15, wherein the processing unit controls the transmission unit not to continue forwarding the data signal when the transmission device is not located in the target area and the data signal comes from the target area.

17. The transmission device according to claim 16, wherein the processing unit determines that the data signal comes from the target area upon determining that a location of the previous transmission device is located in a range of the target area.

18. The transmission device according to claim 15, wherein:
- the processing unit further determines that the data signal comes from the target area when a transmission mode of the data signal is a broadcast transmission mode; and
- the processing unit further determines that the data signal does not come from the target area when the transmission mode of the data signal is a unicast transmission mode.

19. The transmission device according to claim 15, wherein the processing unit retrieves a geographic location of the previous transmission device upon determining that the transmission device is located in the target area, and the geographic location of the previous transmission device together with the data signal are transmitted to the transmission device.

20. The transmission device according to claim 19, wherein the data signal is periodically transmitted to the transmission device, the processing unit further stores the geographic location of the previous transmission device in a table, and the processing unit obtains the geographic location of the previous transmission device by looking up the table.

21. The transmission device according to claim 15, wherein each of the at least one next transmission device periodically transmits another data signal to the transmission device, the processing unit further stores a geographic location of the at least one next transmission device in a table, and the processing unit obtains the geographic location of the at least one next transmission device by looking up the table.

* * * * *